(12) United States Patent
Apicella et al.

(10) Patent No.: US 10,371,301 B2
(45) Date of Patent: Aug. 6, 2019

(54) PIPE SECTION JOINING MEMBER, PIPE JOINT AND ELONGATED PIPE

(71) Applicant: Construction Research & Technology GmbH, Trostberg (DE)

(72) Inventors: Frank Apicella, Hiram, OH (US); Emmanuel Attiogbe, Solon, OH (US); William Gold, Chagrin Falls, OH (US)

(73) Assignee: Construction Research & Technology GmbH et al., Trostberg (DE)

( * ) Notice: Subject to any disclaimer, the term of this patent is extended or adjusted under 35 U.S.C. 154(b) by 469 days.

(21) Appl. No.: 15/059,831

(22) Filed: Mar. 3, 2016

(65) Prior Publication Data

US 2017/0254463 A1 Sep. 7, 2017

(51) Int. Cl.
| | |
|---|---|
| F16L 47/06 | (2006.01) |
| F16L 13/10 | (2006.01) |
| F16L 21/00 | (2006.01) |
| F16L 25/00 | (2006.01) |
| F16L 47/02 | (2006.01) |
| B29C 65/00 | (2006.01) |

(52) U.S. Cl.
CPC ........... *F16L 47/065* (2013.01); *F16L 13/103* (2013.01); *F16L 21/002* (2013.01); *F16L 25/0027* (2013.01); *F16L 47/02* (2013.01); *B29C 65/00* (2013.01)

(58) Field of Classification Search
CPC ..... F16L 47/065; F16L 47/02; F16L 25/0027; F16L 13/103; F16L 21/002; B29C 65/00
USPC ....................... 285/230, 290.1, 370, 397, 423
See application file for complete search history.

(56) References Cited

U.S. PATENT DOCUMENTS

| | | | |
|---|---|---|---|
| 1,762,766 A | * | 6/1930 | De Garay |
| 3,742,985 A | | 7/1973 | Rubenstein |
| 4,499,923 A | | 2/1985 | Hammer |
| 5,039,140 A | * | 8/1991 | Szymczak |
| 5,549,949 A | | 8/1996 | Williams et al. |

(Continued)

FOREIGN PATENT DOCUMENTS

| | | |
|---|---|---|
| CA | 886457 A | 12/1968 |
| CH | 124589 | 4/1928 |

(Continued)

OTHER PUBLICATIONS

International Search Report, PCT/EP2017/054215, dated Jun. 13, 2017.

(Continued)

*Primary Examiner* — Greg Binda
*Assistant Examiner* — Zachary T Dragicevich
(74) *Attorney, Agent, or Firm* — Curatolo Sidoti Co., LPA; Salvatore A. Sidoti; Joseph G. Curatolo

(57) ABSTRACT

An elongated pipe may include a fiber reinforced polymer composite joining member for joining sections of pipe together. A pipe joint and elongated pipe may include at least two pipe sections having ends that are joined together with the joining member. The pipe joint and elongated pipe are formed by joining abutting ends of adjacent pipe sections with the joining member without the need for the adjacent pipe sections to have other connection means, such as standard bell and spigot end connections. A method may include joining pipe sections with the joining member to make an elongated pipe.

44 Claims, 9 Drawing Sheets

(56) References Cited

U.S. PATENT DOCUMENTS

| | | | |
|---|---|---|---|
| 5,951,812 A | 9/1999 | Gilchrist | |
| 8,444,188 B2* | 5/2013 | Pucciani | F16L 21/002 |
| | | | 285/370 |
| 2005/0134045 A1 | 6/2005 | Meera et al. | |
| 2008/0006338 A1* | 1/2008 | Wideman | |
| 2009/0025815 A1* | 1/2009 | Becks | |
| 2014/0305532 A1* | 10/2014 | Glejbol | |
| 2015/0362115 A1* | 12/2015 | Arnold | |

FOREIGN PATENT DOCUMENTS

| | | |
|---|---|---|
| DE | 2116137 | 12/1971 |
| GB | 1420114 A | 7/1972 |
| GB | 2135005 | 8/1984 |
| WO | WO 93/00548 A1 | 1/1993 |
| WO | WO 03/042590 | 11/2001 |

OTHER PUBLICATIONS

International Written Opinion, PCT/EP2017/054215, dated Jun. 13, 2017.

International Search Report, PCT/US2015/012380, dated Sep. 28, 2015.

International Written Opinion, PCT/US2015/012380, dated Sep. 28, 2015.

\* cited by examiner

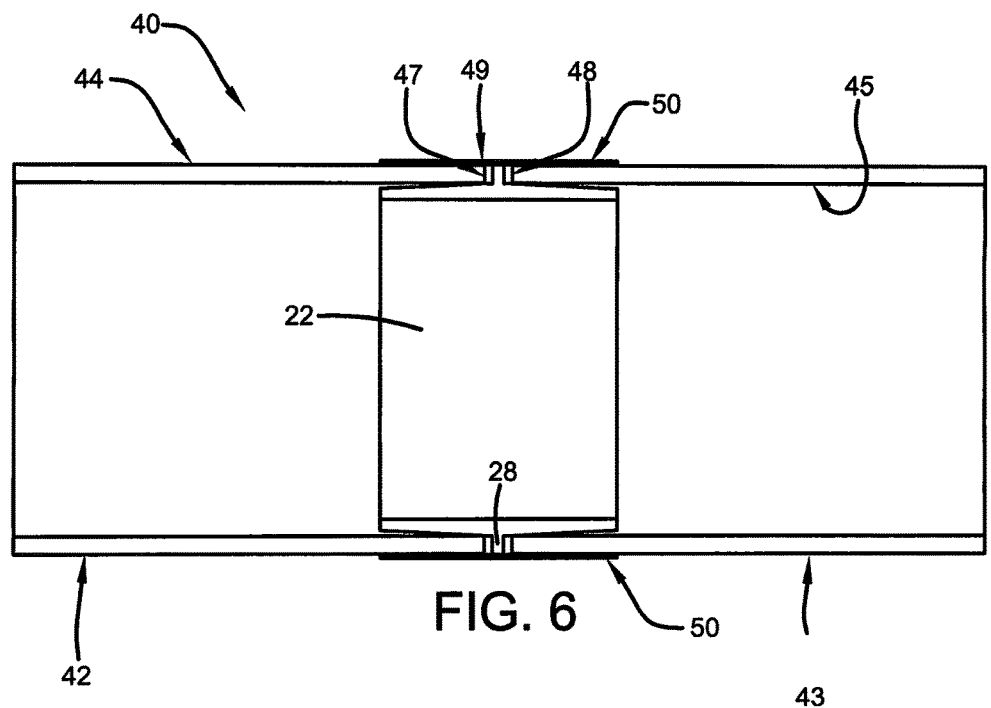
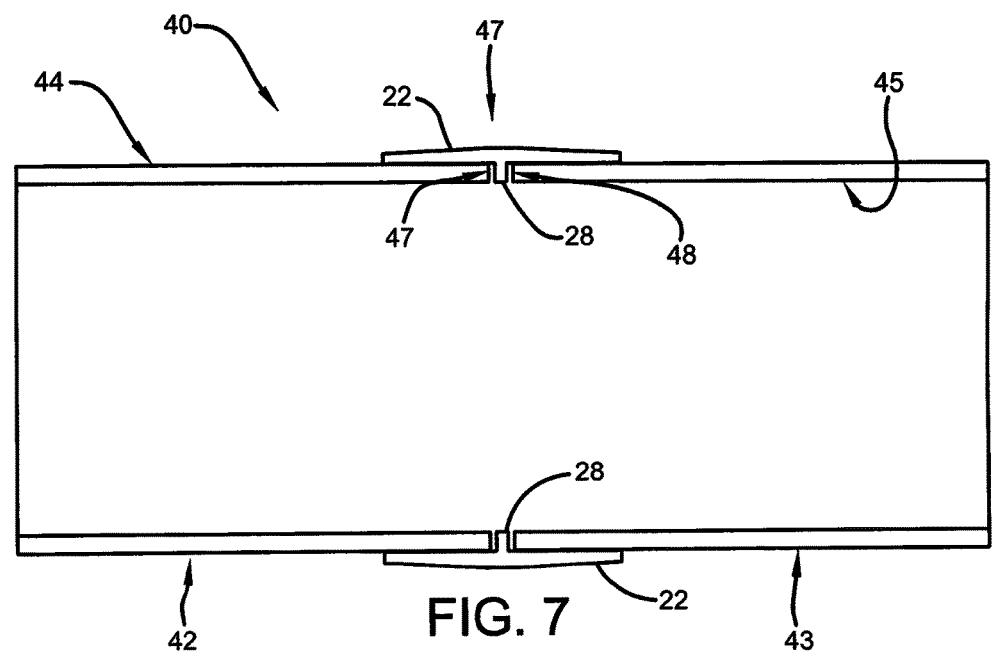

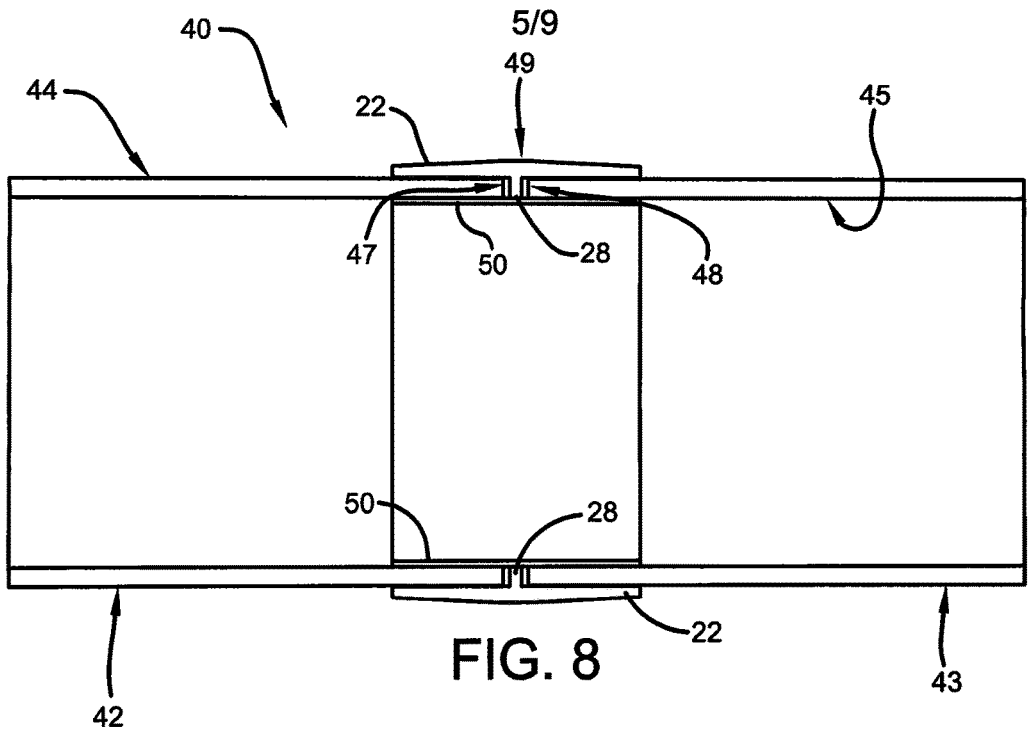
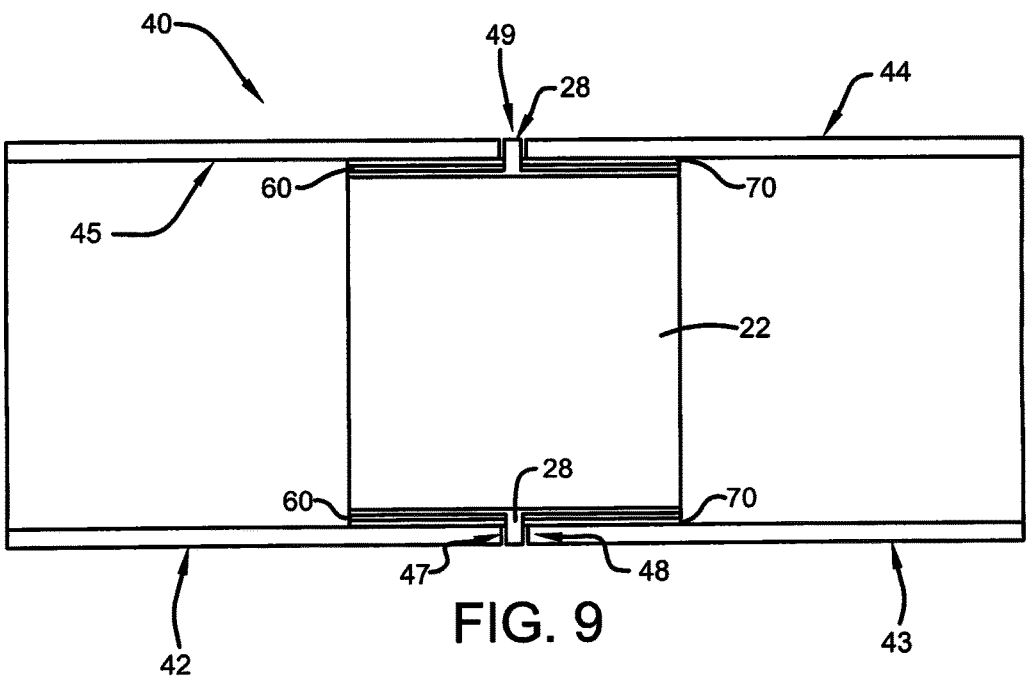

PIPE SECTION JOINING MEMBER, PIPE JOINT AND ELONGATED PIPE

TECHNICAL FIELD

This disclosure is directed to a joining member for joining pipe sections together to form an elongated pipe, a pipe joint including the joining member, an elongated pipe including pipe sections that are joined by the joining member, and a method of joining pipe sections with the joining member to form the elongated pipe.

BACKGROUND

Connections between cementitious pipe sections, such as concrete pipes, are typically "bell and spigot" connections. The "bell" connection typically has a greater diameter than the "spigot" connection, which allows for the "spigot" connection to be inserted into the "bell" connection. These types of connections require that one end of pipe be forcefully inserted (i.e., "stabbed") into the previous section of pipe as the pipe is being laid. Due to the forceful nature of the stabbing process, there is an increased likelihood that the "bell" or "spigot" end connections could be damaged before any actual service of the pipe. The concrete pipe sections using bell and spigot connections also require the presence of rubber sealing gaskets to prevent leakage and to maintain a watertight pipe joint between two pipe sections.

Concrete pipes with bell and spigot connections are also costly to manufacture due to labor required to the produce the bell and spigot end shapes of the pipe sections. Bell and spigot connection pipe is also problematic when thin walled concrete pipe is needed for various jobs, as it is difficult to maintain specified tolerances with smaller components. When thin wall pipes are required, there is difficulty in forming proper bell and spigot connection ends.

SUMMARY

Disclosed is a joining member for joining pipe sections together comprising a continuous band comprising a fiber reinforced polymer composite having a thickness defined between an inner surface and an outer surface and a width defined between opposite marginal sides, wherein said thickness is tapered down from a center portion of said width of said continuous band to said opposite marginal sides of said continuous band; and a flange member extending either (i) outwardly from the outer surface of said continuous band or (ii) inwardly from said inner surface of said continuous band. The use of the fiber reinforced polymer composite joining member to create a pipe joint between adjacent pipe sections to form an elongated pipe also results in strengthening of the transition between the ends of joined pipe sections in the region of the pipe joint.

Additionally disclosed is an elongated pipe comprising a plurality pipe sections, each of said pipe sections comprising a wall thickness defined between an inner surface and an outer surface and a length defined between opposite end faces, wherein said pipe sections do not have integral connection means at opposite longitudinal ends of the pipe sections for connecting one pipe section to another pipe section, wherein said pipe sections are coupled together in an end-to-end manner along their longitudinal axes with a joining member, said joining member comprising a continuous band comprising a fiber reinforced polymer composite having a thickness defined between an inner surface and an outer surface and a width defined between opposite marginal sides and a flange member extending either (i) outwardly from the outer surface of said continuous band or (ii) inwardly from said inner surface of said continuous band.

The elongated pipe does not have integral end connections for connecting one pipe section to another pipe section, such bell and spigot end connections at opposite ends of the pipe section. The phrase "integral end connections" refers to connection means that are formed in the pipe itself, or formed as part of the pipe section itself, such as, without limitation, bell-and-spigot type connections and tongue-and-groove type connections that connect an end of one pipe section to an end of another pipe section to form a longer pipe or pipe section.

Additionally disclosed is an elongated cementitious pipe comprising a plurality cementitious pipe sections, each of said cementitious pipe sections comprising a hardened cementitious matrix and a reinforcement at least partially embedded in said hardened cementitious matrix, a wall thickness defined between an inner surface and an outer surface, and a length defined between opposite end faces, wherein said pipe sections do not have integral connection means at opposite longitudinal ends of the pipe sections for connecting one pipe section to another pipe section, wherein said pipe sections are coupled together in an end-to-end manner along their longitudinal axes with a joining member, said joining member comprising a continuous band comprising a fiber reinforced polymer composite having a thickness defined between an inner surface and an outer surface and a width defined between opposite marginal sides and a flange member extending either (i) outwardly from the outer surface of said continuous band or (ii) inwardly from said inner surface of said continuous band.

Additionally disclosed is an elongated concrete pipe comprising a plurality concrete pipe sections, each of said cementitious pipe sections comprising a hardened concrete matrix and a reinforcement at least partially embedded in said hardened concrete matrix, a wall thickness defined between an inner surface and an outer surface, and a length defined between opposite end faces, wherein said pipe sections do not have integral connection means at opposite longitudinal ends of the pipe sections for connecting one pipe section to another pipe section, wherein said pipe sections are coupled together in an end-to-end manner along their longitudinal axes with a joining member, said joining member comprising a continuous band comprising a fiber reinforced polymer composite having a thickness defined between an inner surface and an outer surface and a width defined between opposite marginal sides and a flange member extending either (i) outwardly from the outer surface of said continuous band or (ii) inwardly from said inner surface of said continuous band.

Further disclosed is a method of joining pipe sections with a joining member to make an elongated pipe comprising: providing a plurality of pipe sections having opposite ends, positioning said pipe sections in an end-to-end manner along their longitudinal axes, engaging a cured or substantially cured fiber reinforced polymer composite joining member to the inner surfaces of said adjacent pipe sections near the ends of said adjacent pipe sections with a flange member of the joining member extending between end faces of the end-to-end pipe sections, and positioning a fiber reinforced polymer composite around at least a portion of the outer surfaces near the ends of end-to-end pipe sections.

Further disclosed is a method of joining pipe sections with a joining member to make an elongated pipe comprising: providing a plurality of pipe sections having opposite ends; positioning said pipe sections in an end-to-end manner along their longitudinal axes, engaging a cured or substantially cured fiber reinforced polymer composite joining member to the outer surfaces of said adjacent pipe sections near the ends of said adjacent pipe sections with a flange member of said joining member extending between the end faces of said end-to-end pipe sections, attaching a fiber reinforced polymer composite around at least a portion of the inner surfaces near the ends of end-to-end pipe sections.

BRIEF DESCRIPTION OF DRAWINGS

FIG. 6 is another cross section view of an illustrative embodiment of the presently disclosed pipe having pipe section joined by a joining member.

FIG. 7 is another cross section view of an illustrative embodiment of the presently disclosed pipe having pipe section joined by a joining member.

FIG. 8 is another cross section view of an illustrative embodiment of the presently disclosed pipe having pipe section joined by a joining member.

FIG. 9 is another cross section view of an illustrative embodiment of the presently disclosed pipe having pipe section joined by a joining member.

DETAILED DESCRIPTION

Figure 1:
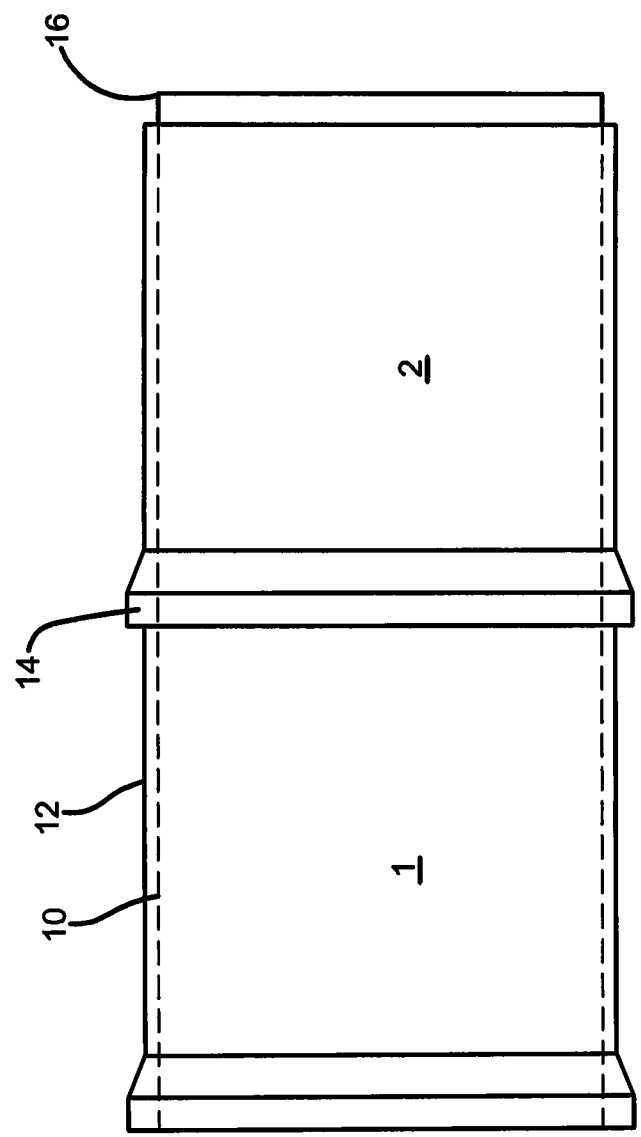
FIG. 1 is a schematic diagram depicting a prior art pipe connection utilizing the bell and spigot pipe connection.

A cured or substantially cured fiber reinforced polymer composite ring or band is used as a joining member to join pipe sections together to form an elongated pipe. The joining member for joining the pipe sections together comprises a continuous band or ring of a cured or substantially cured fiber reinforced polymer composite. The joining member has a thickness that is defined between the inner surface and the outer surface of the band, and a width that is defined between opposite marginal sides of the band. According to certain embodiments, the thickness of the joining member is tapered down from a center portion of the width of the continuous band outwardly toward the opposite marginal sides of the continuous band. The joining member also includes a flange or stem member that extends outwardly from the outer surface of the continuous band or inwardly from the inner surface of the continuous band.

The flange of the joining member may extend outwardly in a manner that is substantially perpendicular from the outer surface of the continuous band. For illustrative embodiments where the joining member includes a flange that extends outwardly from the outer surface thereof, the continuous band portion of the joining member is adapted to be inserted into the ends of the pipe sections being joined together with the flange member extending upwardly from the outer surface of the continuous band and between the end faces of the pipe sections being joined. According to this embodiment, the outer surface of the continuous band of the joining member is adjacent to the inner surface of the pipe sections being joined together with the joining member.

The flange of the joining member may also extend inwardly from the inner surface of the continuous band. The flange member may extend substantially perpendicular from the inner surface of the continuous band. For illustrative embodiments where the joining member includes a flange that extends inwardly from the inner surface thereof, the continuous band portion of the joining member is adapted to surround the ends of the pipe sections being joined together with the flange member extending downwardly from the inner surface of the continuous band and between the end faces of the pipe sections being joined. According to this embodiment, the inner surface of the continuous band of the joining member is adjacent to the outer surface of the pipe sections being joined together with the joining member.

The elongated pipe may comprise a cementitious pipe, a metal pipe, a metal alloy pipe, a polymeric pipe, or a composite pipe. According to certain illustrative embodiments, the elongated pipe having a pipe sections joined together by the fiber reinforced polymer composite joining member comprises a cementitious pipe.

According to certain illustrative embodiments, the cementitious pipe sections do not include integral end connections at opposite ends of the pipe sections, but are joined together in an end-to-end manner with a fiber reinforced polymer composite joining member.

According to certain illustrative embodiments, a cementitious pipe comprises a plurality of cementitious pipe sections that do not include bell and spigot connections at opposite ends, but are joined together in an end-to-end manner with a fiber reinforced polymer composite joining member.

According to certain illustrative embodiments, a cementitious pipe comprises a plurality of cementitious pipe sections not having bell and spigot connections at opposite ends of the pipe sections, and the ends of the pipe sections have a substantially uniform wall thickness and outer diameter, and the pipe sections are joined together in an end-to-end manner with a fiber reinforced polymer composite joining member.

According to certain illustrative embodiments, a cementitious pipe comprises a plurality of reinforced cementitious pipe sections not having bell and spigot connections at opposite ends of the pipe sections, and wherein said ends of the pipe sections have a substantially uniform wall thickness and outer diameter, and the pipe sections joined together in an end-to-end manner with a fiber reinforced polymer composite joining member.

According to certain illustrative embodiments, a hardened concrete pipe comprises a plurality of hardened concrete pipe sections not having integral end connections at opposite ends of the pipe sections, the pipe sections joined together in an end-to-end manner with a fiber reinforced polymer composite joining member.

According to certain illustrative embodiments, a hardened concrete pipe comprises a plurality of reinforced concrete pipe sections not having integral end connections at opposite ends of the pipe sections, the reinforced pipe sections joined together in an end-to-end manner with a fiber reinforced polymer composite joining member.

According to certain illustrative embodiments, a hardened concrete pipe comprises a plurality of concrete pipe sections not having bell and spigot connections at opposite ends of the pipe sections, the pipe sections joined together in an end-to-end manner with a fiber reinforced polymer composite joining member.

According to certain illustrative embodiments, a hardened concrete pipe comprises a plurality of reinforced concrete pipe sections not having bell and spigot connections at opposite ends of the pipe sections, the pipe sections joined together in an end-to-end manner with a fiber reinforced polymer composite joining member.

According to certain illustrative embodiments, a hardened concrete pipe comprises a plurality of concrete pipe sections not having integral ends connections at opposite ends of the pipe sections, and the ends of the pipe sections have a substantially uniform wall thickness and outer diameter, and the pipe sections joined together in an end-to-end manner with a fiber reinforced polymer composite joining member.

According to certain illustrative embodiments, a hardened concrete pipe comprises a plurality of reinforced concrete pipe sections not having integral end connections at opposite ends of the pipe sections, the ends of the pipe sections have a substantially uniform wall thickness and outer diameter, the pipe sections joined together in an end-to-end manner with a fiber reinforced polymer composite joining member.

According to certain illustrative embodiments, a hardened concrete pipe comprises a plurality of concrete pipe sections not having bell and spigot connections at opposite ends of the pipe sections, the ends of the pipe sections have a substantially uniform wall thickness and outer diameter, and the pipe sections joined together in an end-to-end manner with a fiber reinforced polymer composite joining member.

According to certain illustrative embodiments, a hardened concrete pipe comprises a plurality of reinforced concrete pipe sections not having bell and spigot connections at opposite ends of the pipe sections, the ends of the pipe sections have a substantially uniform wall thickness and outer diameter, and the pipe sections joined together in an end-to-end manner with a fiber reinforced polymer composite joining member.

According to certain illustrative embodiments, an inorganic fiber reinforced cementitious pipe comprises a plurality of hardened cementitious pipe sections reinforced with an inorganic fiber reinforcement at least partially embedded therein, the cementitious pipe sections do not have integral end connections at opposites ends of the pipe sections, and the pipe sections are positioned in an end-to-end manner and joined together by a fiber reinforced polymer composite material joining member.

According to certain illustrative embodiments, an inorganic fiber reinforced cementitious pipe comprises a plurality of hardened cementitious pipe sections reinforced with an inorganic fiber reinforcement at least partially embedded therein, the cementitious pipe sections do not have bell and spigot end connections at opposites ends of the pipe sections, and the pipe sections are positioned in an end-to-end manner and joined together by a fiber reinforced polymer composite material joining member.

According to certain illustrative embodiments, an inorganic fiber reinforced concrete pipe comprises a plurality of hardened concrete pipe sections reinforced with an inorganic fiber reinforcement at least partially embedded therein, the concrete pipe sections do not have integral end connections at opposites ends of the pipe sections, and the pipe sections are positioned in an end-to-end manner and joined together by a fiber reinforced polymer composite material joining member.

According to certain illustrative embodiments, an inorganic fiber reinforced concrete pipe comprises a plurality of hardened concrete pipe sections reinforced with an inorganic fiber reinforcement at least partially embedded therein, the concrete pipe sections do not have bell and spigot end connections at opposites ends of the pipe sections, and the pipe sections are positioned in an end-to-end manner and joined together by a fiber reinforced polymer composite material joining member.

According to certain illustrative embodiments, an inorganic fiber reinforced cementitious pipe comprises a plurality of hardened cementitious pipe sections reinforced with an inorganic fiber reinforcement at least partially embedded therein, the cementitious pipe sections do not have integral end connections at opposites ends of the pipe sections, the ends of the pipe sections have a substantially uniform wall thickness and outer diameter, and the pipe sections are positioned in an end-to-end manner and joined together by a fiber reinforced polymer composite material joining member.

According to certain illustrative embodiments, an inorganic fiber reinforced cementitious pipe comprises a plurality of hardened cementitious pipe sections reinforced with an inorganic fiber reinforcement at least partially embedded therein, the cementitious pipe sections do not have bell and spigot end connections at opposites ends of the pipe sections, the ends of the pipe sections have a substantially uniform wall thickness and outer diameter, and the pipe sections are positioned in an end-to-end manner and joined together by a fiber reinforced polymer composite material joining member.

According to certain illustrative embodiments, an inorganic fiber reinforced concrete pipe comprises a plurality of hardened concrete pipe sections reinforced with an inorganic fiber reinforcement at least partially embedded therein, the concrete pipe sections do not have integral end connections at opposites ends of the pipe sections, the ends of the pipe sections have a substantially uniform wall thickness and outer diameter, and the pipe sections are positioned in an end-to-end manner and joined together by a fiber reinforced polymer composite material joining member.

According to certain illustrative embodiments, an organic fiber reinforced concrete pipe comprises a plurality of hardened concrete pipe sections reinforced with an organic fiber reinforcement at least partially embedded therein, the concrete pipe sections do not have bell and spigot end connections at opposites ends of the pipe sections, the ends of the pipe sections have a substantially uniform wall thickness and outer diameter, and the pipe sections are positioned in an end-to-end manner and joined together by a fiber reinforced polymer composite material joining member.

The method of joining pipe sections with a joining member to make an elongated pipe comprises providing a plurality of pipe sections having opposite ends. The pipe sections are positioned in an end-to-end manner along their longitudinal axes. A cured or substantially cured fiber reinforced polymer composite joining member is engaged with the ends of the pipe sections to join them together.

According to certain embodiments, the method of joining pipe sections with a joining member to make an elongated pipe comprises providing a plurality of pipe sections having opposite ends. The pipe sections are positioned in an end-to-end manner along their longitudinal axes. A cured or substantially cured fiber reinforced polymer composite joining member is engaged with the inner surfaces of adjacent pipe sections near the ends of the adjacent pipe sections with the flange member of the joining member extends between end faces of the end-to-end pipe sections. The pipe sections with the joining member engaged therewith are positioned into abutting contact with each other with the flange member of the joining member extending between the end faces of the abutting ends of the pipe sections. A fiber reinforced polymer composite wrap is then positioned around at least a portion of the outer surfaces near the ends of end-to-end pipe sections. The fiber reinforced polymer composite wrap may be applied to the pipe section in a wet state and permitted to cure in place. Alternatively, the fiber reinforced polymer composite wrap may be applied a fully or partially cured fiber reinforced polymer composite three-dimensional piece.

According to alternative embodiments, the method of joining pipe sections with a joining member to make an elongated pipe comprises providing a plurality of pipe sections having opposite ends. The pipe sections are positioned in an end-to-end manner along their longitudinal axes. A cured or substantially cured fiber reinforced polymer composite joining member is engaged with the outer surfaces of adjacent pipe sections near the ends of the adjacent pipe sections with the flange member of the joining member extending downwardly between end faces of the end-to-end pipe sections. The pipe sections with the joining member engaged therewith are positioned into abutting contact with each other with the flange member of the joining member extending between the end faces of the abutting ends of the pipe sections. A fiber reinforced polymer composite wrap is then positioned around at least a portion of the inner surfaces near the same ends of end-to-end pipe sections. The fiber reinforced polymer composite wrap may be applied to the pipe section in a wet state and permitted to cure in place. Alternatively, the fiber reinforced polymer composite wrap may be applied as a fully or partially cured fiber reinforced polymer composite three-dimensional piece.

According to certain illustrative embodiments, a method of making an elongated pipe comprises joining together a plurality of cementitious pipe sections not having integral end connections at opposite ends of the pipe sections.

According to certain illustrative embodiments, a method of making an elongated cementitious pipe comprising joining together a plurality of reinforced cementitious pipe sections not having integral end connections at opposite ends of said pipe sections.

According to certain illustrative embodiments, a method of making an elongated cementitious pipe comprising joining together a plurality of inorganic fabric reinforced cementitious pipe sections not having integral end connections at opposite ends of said pipe sections.

According to certain illustrative embodiments, a method of making an elongated cementitious pipe comprising joining together a plurality of organic fabric reinforced cementitious pipe sections not having integral end connections at opposite ends.

According to certain illustrative embodiments, a method of making an elongated cementitious pipe comprising joining together a plurality of metal fabric reinforced cementitious pipe sections not having integral end connections at opposite ends of said pipe sections.

According to certain illustrative embodiments, a method of making an elongated concrete pipe comprising joining together a plurality of concrete pipe sections not having integral end connections at opposite ends of said pipe sections.

According to certain illustrative embodiments, a method of making an elongated concrete pipe comprising joining together a plurality of reinforced concrete pipe sections not having integral end connections at opposite ends of said pipe sections.

According to certain illustrative embodiments, a method of making an elongated concrete pipe comprising joining together a plurality of inorganic fabric reinforced concrete pipe sections not having integral end connections at opposite ends of said pipe sections.

According to certain illustrative embodiments, a method of making an elongated concrete pipe comprising joining together a plurality of organic fabric reinforced concrete pipe sections not having integral end connections at opposite ends of said pipe sections.

According to certain illustrative embodiments, a method of making an elongated concrete pipe comprising joining together a plurality of metal fabric reinforced concrete pipe sections not having integral end connections at opposite ends of said pipe sections.

According to certain illustrative embodiments, a method of making an elongated concrete pipe comprising joining together a plurality of discontinuous fiber reinforced concrete pipe sections not having integral end connections at opposite ends of said pipe sections, wherein the discontinuous fibers are selected from inorganic fibers, organic fibers, metal fibers, metal alloy fibers and mixtures thereof.

According to certain illustrative embodiments, a method of making an elongated concrete pipe comprising joining together a plurality of discontinuous inorganic fiber reinforced concrete pipe sections not having integral end connections at opposite ends of said pipe sections.

According to certain illustrative embodiments, a method of making an elongated concrete pipe comprising joining together a plurality of discontinuous organic fiber reinforced concrete pipe sections not having integral end connections at opposite ends of said pipe sections.

According to certain illustrative embodiments, a method of making an elongated concrete pipe comprising joining together a plurality of discontinuous metal fiber reinforced concrete pipe sections not having integral end connections at opposite ends of said pipe sections.

According to certain illustrative embodiments, a method of making a reinforced concrete pipe comprises providing a hardenable concrete material, providing a reinforcement, combining said reinforcement with said hardenable concrete material to form a substantially tubular green pipe section not having bell and spigot end connections at opposite ends of said green pipe section, allowing said green pipe sections to harden, and joining said pipe sections together in an end-to-end manner with a fiber reinforced polymer composite joining member.

According to certain illustrative embodiments, a method of making a reinforced concrete pipe comprises providing a hardenable concrete material, providing a reinforcement, combining said reinforcement with said hardenable concrete material to form a substantially tubular green pipe section not having integral end connections at opposite ends of said green pipe section, wherein said ends of said pipe sections have a substantially uniform wall thickness and outer diameter, allowing said green pipe sections to harden, and joining said pipe sections together in an end-to-end manner with a fiber reinforced polymer composite joining member.

According to certain illustrative embodiments, a method of making a reinforced concrete pipe comprises providing a hardenable concrete material, providing a reinforcement, combining said reinforcement with said hardenable concrete material to form a substantially tubular green pipe section not having bell and spigot end connections at opposite ends of said green pipe section, wherein said ends of said pipe sections have a substantially uniform wall thickness and outer diameter, allowing said green pipe sections to harden, and joining said pipe sections together in an end-to-end manner with a fiber reinforced polymer composite joining member.

According to certain illustrative embodiments, a method of making a cementitious pipe joint comprises providing a plurality of hardened cementitious pipe sections each of the pipe sections having a longitudinal axis and opposite ends with substantially uniform wall thickness and outer diameters, and without integral end connections on opposite ends of said pipe sections for connecting one pipe section to another pipe section, such as bell and spigot end connections. The pipe sections are positioned in an adjacent end-to-end manner along their longitudinal axis. A cured or substantially cured fiber reinforced polymer composite joining member is engaged with the inner surfaces of the adjacent pipe sections near the ends of the pipe sections with a flange member of the joining member extending between end faces of the end-to-end pipe sections to form a pipe joint. The pipe sections are moved into abutting contact with the flange located between the end faces of the abutting ends of adjacent pipe sections. A fiber reinforced polymer composite wrap is applied around at least a portion of the outer surfaces of the joined pipe sections at the pipe joint.

According to certain illustrative embodiments, a method of making a cementitious pipe joint comprises providing a plurality of hardened cementitious pipe sections each of the pipe sections having a longitudinal axis and opposite ends with substantially uniform wall thickness and outer diameters, and without integral end connections on opposite ends of said pipe sections for connecting one pipe section to another pipe section, such as bell and spigot end connections. The pipe sections are positioned in an adjacent end-to-end manner along their longitudinal axis. A cured or substantially cured fiber reinforced polymer composite joining member is engaged with the outer surfaces of the adjacent pipe sections near the ends of the pipe sections with a flange member of the joining member extending downwardly between end faces of the end-to-end pipe sections to form a pipe joint. The pipe sections are moved into abutting contact with the flange located between the end faces of the abutting ends of adjacent pipe sections. A fiber reinforced polymer composite wrap is applied around at least a portion of the inner surfaces of the joined pipe sections at the pipe joint.

According to certain illustrative embodiments, a method of making a concrete pipe joint comprises providing a plurality of hardened concrete pipe sections each of the pipe sections having a longitudinal axis and opposite ends with substantially uniform wall thickness and outer diameters, and without integral end connections on opposite ends of said pipe sections for connecting one pipe section to another pipe section, such as bell and spigot end connections. The pipe sections are positioned in an adjacent end-to-end manner along their longitudinal axis. A cured or substantially cured fiber reinforced polymer composite joining member is engaged with the inner surfaces of the adjacent pipe sections near the ends of the pipe sections with a flange member of the joining member extending between end faces of the end-to-end pipe sections to form a pipe joint. The pipe sections are moved into abutting contact with the flange located between the end faces of the abutting ends of adjacent pipe sections. A fiber reinforced polymer composite wrap is applied around at least a portion of the outer surfaces of the joined pipe sections at the pipe joint.

According to certain illustrative embodiments, a method of making a concrete pipe joint comprises providing a plurality of hardened concrete pipe sections each of the pipe sections having a longitudinal axis and opposite ends with substantially uniform wall thickness and outer diameters, and without integral end connections on opposite ends of said pipe sections for connecting one pipe section to another pipe section, such as bell and spigot end connections. The pipe sections are positioned in an adjacent end-to-end manner along their longitudinal axis. A cured or substantially cured fiber reinforced polymer composite joining member is engaged with the outer surfaces of the adjacent pipe sections near the ends of the pipe sections with a flange member of the joining member extending downwardly between end faces of the end-to-end pipe sections to form a pipe joint. The pipe sections are moved into abutting contact with the flange located between the end faces of the abutting ends of adjacent pipe sections. A fiber reinforced polymer composite wrap is applied around at least a portion of the inner surfaces of the joined pipe sections at the pipe joint.

The cementitious pipe comprises a cementitious matrix that is reinforced with a fibrous reinforcement that is at least partially embedded within the cementitious matrix. Alternatively, the fibrous reinforcement is fully embedded within the cementitious matrix. The hardened cementitious pipe sections that are used to form the elongated cementitious pipe do not include integral connection means located at opposite longitudinal ends of the pipe section for connecting one pipe section to another pipe sections. For example, and without limitation, the hardened cementitious pipe sections do not have the standard bell and spigot end connections, or tongue-and-groove connections, that are typically used to connect sections of pipe together to form a longer pipe.

A fully cured, partially cured, or substantially cured fiber reinforced polymer composite joining member is used as a connector or coupler to couple two cementitious pipe sections together to provide a longer cementitious pipe. The fiber reinforced polymer composite joining member structurally joins the abutting pipe sections together to form an elongated pipe, and provides a watertight seal between two sections of pipe.

The fiber reinforced polymer composite joining member is comprised of a fibrous reinforcing material and a polymer resin that binds the fibrous component of the composite together. The fiber reinforced polymer composite joining member is engaged with the exterior and/or interior surfaces of the cementitious pipe sections near the opposite longitudinal ends of the pipe sections that are positioned in abutting contact. The fiber reinforced polymer composite joining member may be engaged with the outer or inner surfaces of the ends of abutting cementitious pipe sections that have been positioned in an end-to-end manner in the direction of the longitudinal axis of the pipe sections. The fiber reinforced polymer composite wrap has specific fiber orientation and fiber content to allow for adequate load transfer between the pipe sections.

According to certain illustrative embodiments, a method of making a concrete pipe joint comprises providing a plurality of hardened concrete pipe sections each of the pipe sections having a longitudinal axis and opposite ends with substantially uniform wall thickness and outer diameters, and without integral end connections on opposite ends of said pipe sections for connecting one pipe section to another pipe section, such as bell and spigot end connections. The pipe sections are positioned in an adjacent end-to-end manner along their longitudinal axis. An adhesive or mastic is applied to the inner surfaces of the abutting pipe sections. A cured or substantially cured fiber reinforced polymer composite joining member is engaged with the inner surfaces of the adjacent pipe sections near the ends of the pipe sections with the adhesive or mastic disposed between the inner surfaces of the pipe sections and the outer surfaces of the joining member. The flange member of the joining member extends upwardly between end faces of the end-to-end pipe sections to form a pipe joint. The pipe sections are moved into abutting contact with the flange located between the end faces of the abutting ends of adjacent pipe sections. A fiber reinforced polymer composite wrap is applied around at least a portion of the outer surfaces of the joined pipe sections at the pipe joint.

According to certain illustrative embodiments, a method of making a concrete pipe joint comprises providing a plurality of hardened concrete pipe sections each of the pipe sections having a longitudinal axis and opposite ends with substantially uniform wall thickness and outer diameters, and without integral end connections on opposite ends of said pipe sections for connecting one pipe section to another pipe section, such as bell and spigot end connections. The pipe sections are positioned in an adjacent end-to-end manner along their longitudinal axis. A primer layer is applied to the inner surfaces of the abutting pipe sections at or near the location where the pipe sections are to be joined. An adhesive or mastic is applied to the primer layer on the abutting pipe sections. A cured or substantially cured fiber reinforced polymer composite joining member is engaged with the inner surfaces of the adjacent pipe sections near the ends of the pipe sections with the adhesive or mastic disposed between the primer and the outer surfaces of the joining member. The flange member of the joining member extends upwardly between end faces of the end-to-end pipe sections to form a pipe joint. The pipe sections are moved into abutting contact with the flange located between the end faces of the abutting ends of adjacent pipe sections. A fiber reinforced polymer composite wrap is applied around at least a portion of the outer surfaces of the joined pipe sections at the pipe joint.

According to certain illustrative embodiments, a method of making a concrete pipe joint comprises providing a plurality of hardened concrete pipe sections each of the pipe sections having a longitudinal axis and opposite ends with substantially uniform wall thickness and outer diameters, and without integral end connections on opposite ends of said pipe sections for connecting one pipe section to another pipe section, such as bell and spigot end connections. The pipe sections are positioned in an adjacent end-to-end manner along their longitudinal axis. An adhesive or mastic is applied to the outer surfaces of the abutting pipe sections. A cured or substantially cured fiber reinforced polymer composite joining member is engaged with the outer surfaces of the adjacent pipe sections near the ends of the pipe sections with the adhesive or mastic disposed between the outer surfaces of the pipe sections and the inner surfaces of the joining member. The pipe sections are moved into abutting contact with the flange located between the end faces of the abutting ends of adjacent pipe sections. A fiber reinforced polymer composite wrap is applied around at least a portion of the inner surfaces of the joined pipe sections at the pipe joint.

According to certain illustrative embodiments, a method of making a concrete pipe joint comprises providing a plurality of hardened concrete pipe sections each of the pipe sections having a longitudinal axis and opposite ends with substantially uniform wall thickness and outer diameters, and without integral end connections on opposite ends of said pipe sections for connecting one pipe section to another pipe section, such as bell and spigot end connections. The pipe sections are positioned in an adjacent end-to-end manner along their longitudinal axis. A primer layer is applied to the outer surfaces of the abutting pipe sections at or near the location where the pipe sections are to be joined. An adhesive or mastic is applied to the primer layer on the abutting pipe sections. A cured or substantially cured fiber reinforced polymer composite joining member is engaged with the outer surfaces of the adjacent pipe sections near the ends of the pipe sections with the adhesive or mastic disposed between primer and the inner surfaces of the joining member. The pipe sections are moved into abutting contact with the flange located between the end faces of the abutting ends of adjacent pipe sections. A fiber reinforced polymer composite wrap is applied around at least a portion of the inner surfaces of the joined pipe sections at the pipe joint.

Pipes having integral bell and spigot end connections have one end with a smaller outside diameter, which is known in the art as the spigot end connection, and one end with a larger outer diameter, which is known in the art as the bell connection. The bell and spigot connection pipes are designed such that the spigot end of an adjoining pipe is at least partially inserted into the bell end connection of another pipe. Because the dimensions are not consistent, bell and spigot pipes do not have an even weight distribution and may be more difficult to handle.

In contrast to the prior art concrete pipes, the presently disclosed reinforced cementitious pipes do not have bell and spigot connections at opposite ends of the pipe sections. According to certain embodiments, the cementitious pipes have a substantially uniform wall thickness and substantially uniform inner and outer diameters at the opposite ends of the pipe, such that the pipe sections approximate the shape of a cylinder with open ends. Pipes with substantially uniform wall thickness and inner/outer diameter have a substantially equal weight distribution, which facilitates handling, transportation, and installation. Furthermore, because the inner diameter of the pipe with substantially uniform diameter and wall thickness is consistent from one section to another, fluid flow characteristics may be improved over prior art pipe designs.

According certain embodiments, the fibrous reinforcement may comprise a plurality of discreet fibers that are blended into the cementitious composition. The blend of cementitious composition and randomly dispersed discreet fibers is formed into a green pipe shape that does not have integral connection means located at opposite longitudinal ends of the pipe section for connecting one pipe section to another pipe sections, such as bell and spigot end connections, and preferably has a uniform wall thickness and uniformed inner/outer diameter at least near the opposite ends of the pipe sections. Once the blend of cementitious composition and reinforcing fibers are formed into the green pipe shape, then shape is permitted to harden to form the reinforced cementitious pipe.

The reinforced cementitious pipe sections are manufactured by preparing or providing a cementitious composition or matrix. A suitable fibrous reinforcement is provided and combined with the cementitious composition. According certain embodiments, the fibrous reinforcement may comprise a plurality of discreet fibers that are blended into the cementitious composition. The blend of cementitious composition and randomly dispersed discreet fibers is formed into a green pipe shape that does not have do not include integral connection means located at opposite longitudinal ends of the pipe section for connecting one pipe section to another pipe sections, such as bell and spigot end connections, and preferably has a uniform wall thickness and uniformed outer diameter at least near the opposite ends of the pipe sections. Once the blend of cementitious composition and reinforcing fibers are formed into the green pipe shape, then shape is permitted to harden to form the reinforced cementitious pipe.

The reinforced cementitious pipe sections are manufactured by preparing or providing a cementitious composition or matrix. A suitable fibrous fabric reinforcement is provided and formed into an elongated substantially tubular shape. The cementitious composition is combined with the fibrous fabric reinforcement by infiltrating the fabric reinforcement with a cementitious composition such that the fabric reinforcement is substantially surrounded or enveloped with the cementitious composition. The cementitious composition is permitted to harden to form the fiber reinforced pipe section.

The reinforced pipe sections may be made by preparing or providing a cementitous composition, such as a concrete or mortar matrix, providing a fibrous reinforcement in a substantially tubular shape, positioning the tubular shape of fibrous fabric reinforcement into a suitable mold, introducing the cementitious composition into the mold so as to infiltrate or otherwise impregnate the fibrous fabric reinforcement, allowing the cementitious composition to harden, and removing the hardened and reinforced cementitious pipe from the mold.

According to any of the above described embodiments of the pipe section or elongated pipe formed by joining a number of pipe sections, the thickness of the pipe section is from about 2 inches to about 11 inches.

According to any of the above described embodiments of the pipe section or elongated pipe formed by joining a number of pipe sections, the outer diameter of the pipe section is from about 12 inches to about 144 inches.

Without limitation, the cementitious matrix that is used to manufacture the pipe sections, and resulting elongated pipe, may include concrete, mortar, grout, and hydraulic paste. According to certain illustrative embodiments, the cementitious matrix used to manufacture the pipe sections is concrete.

According to certain embodiments, the fibrous material for reinforcing the pipe sections is in the form of an open weave fabric that is configured to receive a cementitious material to form a fiber-reinforced cementitious composite. For example, and without limitation, the fibrous material may have a weave structure to facilitate formation of a composite when the cementitious material is applied to the fibrous fabric. According to certain embodiments, the fibrous reinforcement is uni-directional, bi-directional, or omni-directional fabric. The fibers of the uni-directional, bi-directional, or omni-directional fibrous reinforcement comprise any fibers that may be used to prepare a fabric which can absorb tensile stresses and loads that would otherwise crack or break the cementitious matrix of the pipe. A primary consideration in the choice of materials will be resistance to the components of the liquid carried in the pipe. Generally, the weave structure and other properties of the fiber may be specified to facilitate penetration of cementitious matrix into the fiber structure.

The fibrous fabric reinforcement used to reinforce the cementitious composition to manufacture a reinforced cementitious pipe section comprises inorganic fiber fabric, a polymer fiber fabric, a metal fiber fabric, a metal alloy fiber fabric. The reinforcing fiber fabric may be manufactured one or more than one different type of fabric material. Alternatively, the reinforcement may comprise one or more layer of the same type of fibrous fabric, or more than one layer of different types of fabrics. The number of reinforcing layers depends on the desired pressure rating or desired maximum allowable operating pressure of the pipe. The ultimate load the pipe may be subject to determines the thickness of the reinforcing layer, keeping in mind that excessive thickness unnecessarily reduces pipe capacity.

The inorganic fiber fabrics may be prepared from carbon fibers or glass fibers. The metal alloy fibers may comprise steel fibers. Steel is a common alloy of carbon and iron known for its strength and flexibility as compared with other iron alloys. The polymer fibers may be selected from the group consisting of acrylic polyaramid fibers, polyalkylene fibers such as polyethylene and polypropylene fibers, polyester fibers, nylon fibers and combinations thereof.

The reinforcement for the cementitious pipe may also be a combination of one or more fiber fabrics and one or more type of discreet reinforcing fibers.

The fiber reinforced polymer composite generally comprises a polymer resin material that is reinforced with a fibrous fabric. Without limitation, and only by way of illustration, the fibrous fabric component of the fiber reinforced polymer composite comprises carbon fiber fabrics and glass fiber fabrics. Carbon fibers are useful fibers for their stiffness, strength and application properties, if the carbon fiber materials will be compatible with the underlying pipe. The carbon fibers may be provided in the form of an open, woven carbon fiber fabric. An exemplary form of useful carbon fiber is MASTERBRACE® carbon fiber fabrics available from BASF Corporation (Shakopee, Minn., USA).

The fibrous fabric reinforcement is configured to receive a polymer resin, such as such as epoxy and polyurethane polymer resins. Without limitation, suitable polymer resins of the fiber reinforced polymer composite may comprise polyester, epoxy, vinylester, acrylic, modified acrylic, urethane, phenolic, polyamide, bismaleimide, polyurea, or combinations thereof. According to illustrative embodiments, the polymer resin of the fiber reinforced polymer composite comprises an epoxy polymer resin. According to certain embodiments, the polymer resin may further comprise curing agents, accelerators, and colorants as additives. Additives may be included in the polymer resin to affect various resin properties in several ways. Additives may be included that affect the color, curing time, vapor production/inclusion, volatility, viscosity, and miscibility of the resin.

The polymer matrix of the joining member maybe a thermoplastic or thermosetting polymer resin. Without limitation, suitable polymer resins of the fiber reinforced polymer composite joining member may comprise polyester, epoxy, vinyl ester, acrylic, modified acrylic, urethane, phenolic, polyamide, bismaleimide, polyurea, polyvinylidene fluoride, chlorinated polyvinyl chloride, polyvinyl chlroide, polybutylene, cross-linked polyethylene, polyethylene, and combinations thereof. Without limitation, and only by way of illustration, the fibrous fabric component of the fiber reinforced polymer composite joining member comprises aramid fiber fabrics, basalt fiber fabrics, carbon fiber fabrics, glass fiber fabrics, and ultra-high molecular weight polyolefin fabrics. Carbon fibers are useful fibers for their stiffness, strength and application properties, if the carbon fiber materials will be compatible with the underlying pipe. The carbon fibers may be provided in the form of an open, woven carbon fiber fabric. An exemplary form of useful carbon fiber is MASTERBRACE® carbon fiber fabrics available from BASF Corporation (Shakopee, Minn., USA). According to illustrative embodiments, the polymer resin of the fiber reinforced polymer composite joining member comprises an epoxy polymer resin and the fabric reinforcement comprises a carbon fiber fabric reinforcement. According to illustrative embodiments, the polymer resin of the fiber reinforced polymer composite comprises an epoxy polymer resin and the fabric reinforcement comprises a glass fiber fabric reinforcement.

According to certain embodiments, the polymer resin component of the fiber reinforced polymer composite joining member comprises from about 95% to about 30% by volume of the fiber reinforced polymer composite joining member and the fibrous reinforcement component of the fiber reinforced polymer composite comprises from about 5% to about 95% by volume of the fiber reinforced polymer composite.

According to certain embodiments, the fibrous fabric of the fiber reinforced polymer composite may have a thickness of from about 0.02 inches to about 0.25 inches; a width of from about 3 inches to about 15 inches, and a length of from about 25 inches to about 500 inches.

It was unexpectedly discovered that fiber reinforced pipes could be constructed with a smaller wall thickness and increased length, while maintaining comparable strength to pipes of the prior art, which have greater wall thickness and multiple layers of reinforcement. The fiber reinforcement strengthens the cementitious walls similar to steel rebar, but does so at a fraction of the volume. As the fiber reinforcement requires less volume than traditional rebar reinforcing methods, pipes may be lengthened and the walls may be narrowed without sacrificing strength properties.

In certain embodiments the method of joining pipe sections comprises providing a plurality of reinforced and hardened cementitious pipe sections without bell and spigot end connections at opposite ends of the pipe sections and placing the pipe sections in an end-to-end manner in the direction of the longitudinal axis of the pipe sections with ends of the pipe sections in abutting or adjacent contact. The joining member is engaged with either the inner or outer surfaces of the pipe sections to be joined together and the pipe sections then positioned in abutting end-to-end contact. If the joining member is engaged with the inner surfaces of the pipe sections, then a layer of primer may applied over the exterior surfaces of the abutting ends of the pipe sections. If the joining member is engaged with the outer surfaces of the pipe sections, then a layer of primer may applied over the inner surfaces of the abutting ends of the pipe sections. A layer of polymer resin is applied over the primer applied on the abutting ends of the pipe sections. The reinforcing fibrous fabric, such as a bi-directional carbon fiber fabric or bi-directional glass fiber fabric, is at least partially embedded in the layer of polymer resin. Another layer of polymer resin is applied to the reinforcing fibrous fabric layer to cover the fabric. The polymer resin layers are allowed to cure to form a cured fiber reinforced polymer composite.

Each selected pipe section has substantially the same dimensions is placed end to end. The end sections are then placed in adjacent contact. Adjacent physical contact with another pipe section end is desired to minimize and eliminate gaps which could increase fluid leakage through the joined pipes. Once the pipe sections are in adjacent contact, the fiber reinforced polymer composite is wrapped around end sections in adjacent contact. The fiber reinforced polymer composite seals any remaining gaps between the pipe sections in adjacent contact to prevent leakage. Once the fiber reinforced polymer composite cures, a durable joint between the pipe sections in adjacent contact is created.

The combination of the primer and adhesive further improves the adhesion between the exterior surface of the first and second pipe sections and the fiber reinforced polymer composite. In certain embodiments, the primer coating layer may be applied over a greater surface area of the pipe section ends placed in adjacent contact than the adhesive.

According to certain embodiments, the additional inner or outer fiber reinforcement polymer composite wrap is applied to the inner or outer surfaces of the pipe sections in either a wet or dry state. In certain embodiments, the fibrous fabric reinforcement is first dipped in a polymer resin and saturated. The resulting resin saturated fiber reinforced polymer is then applied to an exterior surface of the pipe. The saturated or partially saturated fiber reinforced polymer is considered to be "wet layup" by those skilled in the art.

In certain embodiments, the additional fiber reinforced polymer composite wrap is applied to the surfaces of the pipe sections in a dry state. A polymer resin layer is first applied to the surfaces of the pipe sections. The dry fibrous fabric reinforcement is embedded in the wet polymer layer and a second polymer resin layer is applied over the fabric reinforcement. The resulting resin saturated fiber reinforced polymer may be allowed to partially cure and is then applied to an outer surface of the pipe. The saturated or partially saturated fiber reinforced polymer which is partially cured is considered to be "dry layup" by those skilled in the art.

FIG. 1 shows a pipe connection according to the prior art. Each of pipes 1, 2 have an inner wall 10 and an outer wall 12 and a thickness extending between 10 and 12. The opposite ends of pipes 1 and 2 have bell 14 and spigot 16 connections. The pipes are designed such that spigot connection 16 will be inserted into the bell connection 14 as the pipe sections are assembled to create a longer pipe. A tight connection between spigot connection 16 and bell connection 14 is particularly important in applications where water or fluids are transported through the pipe.

Figure 2:
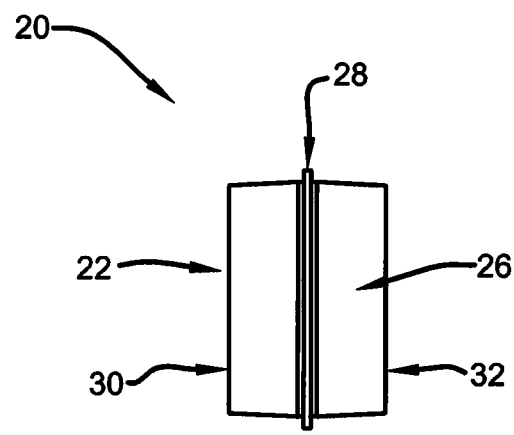
FIG. 2 is a side view of an illustrative embodiment of the presently disclosed pipe section joining member.
Figure 3:
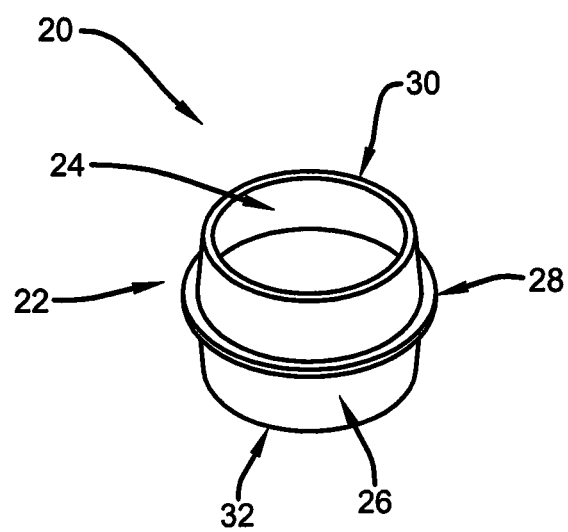
FIG. 3 is a perspective view of an illustrative embodiment of the presently disclosed pipe section joining member.

FIGS. 2 and 3 show an illustrative embodiment of the joining member 20. Joining member 20 comprises a continuous ring 22. Continuous ring 22 of joining member 20 includes opposite facing inner 24 and outer 26 surfaces. A flange member 28 extends outwardly in a substantially perpendicular manner from the outer surface 26 of the ring 22 of joining member 20. As shown in FIGS. 2 and 3 flange member 28 extends radially in a substantially perpendicular manner from the center of the outer surface 26 of the ring 22 of joining member 20. The wall thickness of the continuous ring 22 of the joining member 20 gradually decreases from the flange 28 to the opposite ends 30, 32 of the ring 22 thereby forming tapered angles on each side of the flange member 28. The tapered angle sides of the ring 22 promote easier insertion into the pipe sections to be joined.

Figure 4:
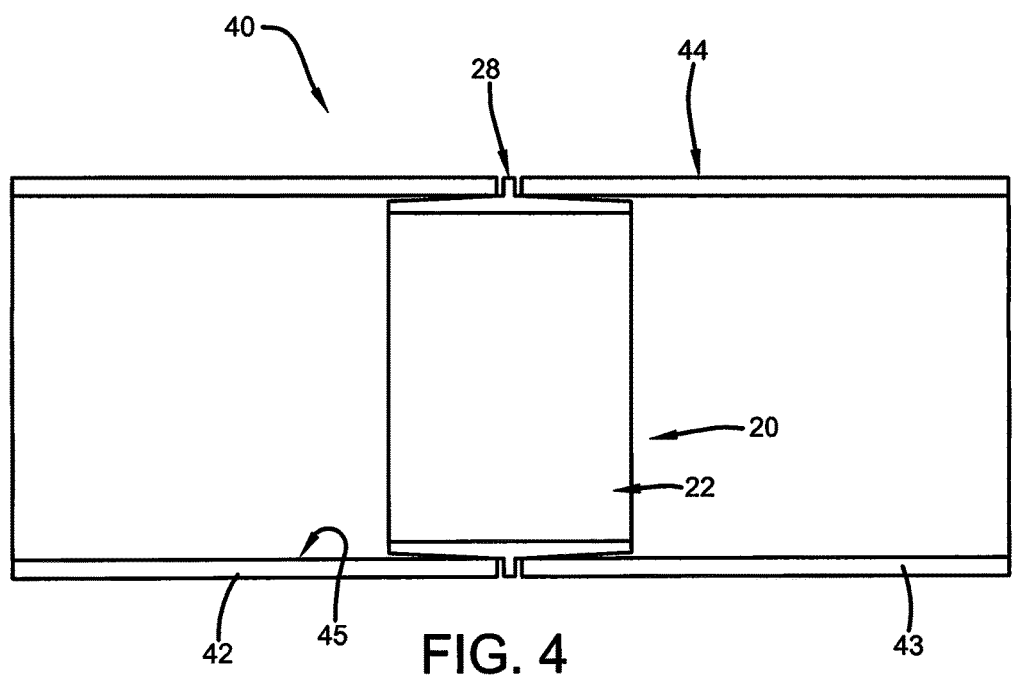
FIG. 4 is an enlarged fragmentary view of an illustrative embodiments of the joining member.

FIG. 4 shows a cross-section of a pipe 40 formed by joining together pipe sections 42, 43 with joining member 20. Pipe sections 42 and 43 have an inner wall 45 and outer wall 44. The thickness of pipe sections 42, 43 is substantially uniform along the length of the pipe. The pipe sections 42, 43 do not include integral bell-and-spigot connection means at their ends. The ends of pipe sections 42, 43 are positioned in end-to-end abutting contact along their longitudinal axes. Joining member 20 in engaged with the inner surfaces of the pipe sections 42, 43. The flange member 28 of the ring 22 of the joining member 20 extends upwardly into the space between the end faces of the end of pipe section 42 and end of pipe section 43 to form a butt joint joining together pipe sections 42, 43.

Figure 5:
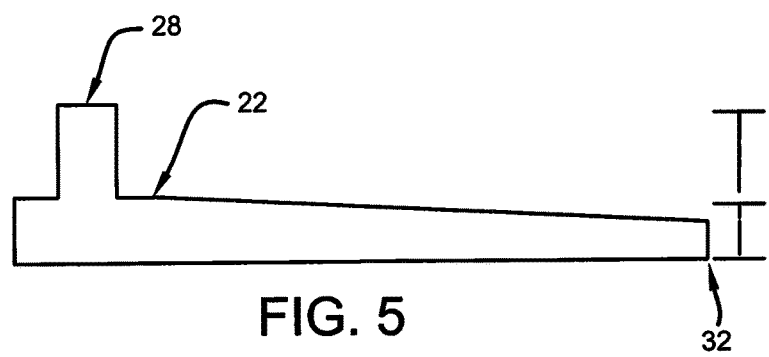
FIG. 5 is a cross section view of an illustrative embodiment of the presently disclosed pipe having pipe section joined by a joining member.

FIG. 5 shows a cross-section of one side of the continuous ring 22 of the joining member 20. The wall thickness T of the continuous ring 22 of the joining member 20 gradually decreases from the flange 28 to the opposite end 32 of the ring 22 to form a tapered angle on the side of the flange member 28.

FIG. 6 shows a cross-section of a pipe 40 formed by joining together pipe sections 42, 43 with joining member 20. Pipe sections 42 and 43 have an inner wall 45 and outer wall 44. The thickness of pipe sections 42, 43 is substantially uniform along the length of the pipe. The pipe sections 42, 43 do not include integral bell-and-spigot connection means at their ends 46, 47. The ends of pipe sections 42, 43 are positioned in end-to-end abutting contact along their longitudinal axes. Joining member 20 in engaged with the inner surfaces of the pipe sections 42, 43. The flange member 28 of the ring 22 of the joining member 20 extends upwardly into the space between the end faces of the end 47 of pipe section 42 and end 48 of pipe section 43 to form a butt joint 49 joining together pipe sections 43, 44. Additional fiber reinforced polymer composite wrap 50 is applied around the outer wall 44 of pipe sections 42, 43 at the location of the butt joint 49 to further reinforce and strengthen the butt joint 49.

FIG. 7 shows a cross-section of a pipe 40 formed by joining together pipe sections 42, 43 with joining member 20. Pipe sections 42 and 43 have an inner wall 45 and outer wall 44. The thickness of pipe sections 42, 43 is substantially uniform along the length of the pipe. The pipe sections 42, 43 do not include integral bell-and-spigot connection means at their ends 46, 47. The ends of pipe sections 42, 43 are positioned in end-to-end abutting contact along their longitudinal axes. Joining member 20 in engaged with the outer surfaces of the pipe sections 42, 43. The flange member 28 of the ring 22 of the joining member 20 extends downwardly into the space between the end faces of the end 47 of pipe section 42 and end 48 of pipe section 43 to form a butt joint 49 joining together pipe sections 43, 44.

FIG. 8 shows a cross-section of a pipe 40 formed by joining together pipe sections 42, 43 with joining member 20. Pipe sections 42 and 43 have an inner wall 45 and outer wall 44. The thickness of pipe sections 42, 43 is substantially uniform along the length of the pipe. The pipe sections 42, 43 do not include integral bell-and-spigot connection means at their ends 47, 48. The ends of pipe sections 42, 43 are positioned in end-to-end abutting contact along their longitudinal axes. Joining member 20 in engaged with the outer surfaces of the pipe sections 42, 43. The flange member 28 of the ring 22 of the joining member 20 extends downwardly into the space between the end faces of the end 47 of pipe section 42 and end 48 of pipe section 43 to form a butt joint 49 joining together pipe sections 43, 44. Additional fiber reinforced polymer composite wrap 50 is applied about the inner wall 45 of the pipe sections 42, 43 at the location of the butt joint 49 to further reinforce and strengthen the butt joint 49.

FIG. 9 shows a cross-section of a pipe 40 formed by joining together pipe sections 42, 43 with joining member 20. Pipe sections 42 and 43 have an inner wall 45 and outer wall 44. The thickness of pipe sections 42, 43 is substantially uniform along the length of the pipe. The pipe sections 42, 43 do not include integral bell-and-spigot connection means at their ends 47, 48. The ends of pipe sections 42, 43 are positioned in end-to-end abutting contact along their longitudinal axes. Joining member 20 in engaged with the inner surfaces of the pipe sections 42, 43. The flange member 28 of the ring 22 of the joining member 20 extends upwardly into the space between the end faces of the end 47 of pipe section 42 and end 48 of pipe section 43 to form a butt joint 49 joining together pipe sections 43, 44. A primer layer 60 is applied to the inner surfaces 45 of piper sections 42, 43 and an adhesive layer 70 is applied to the primer layer 60.

Figure 10A:
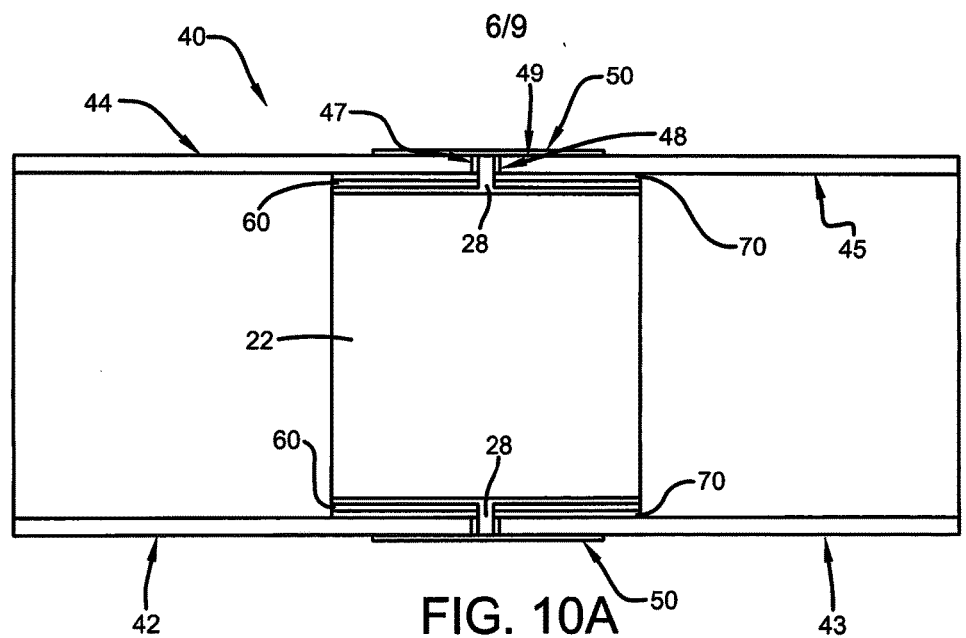
FIGS. 10A and 10B are cross section and perspective views of an illustrative embodiment of the presently disclosed pipe having pipe section joined by a joining member.
Figure 10B:
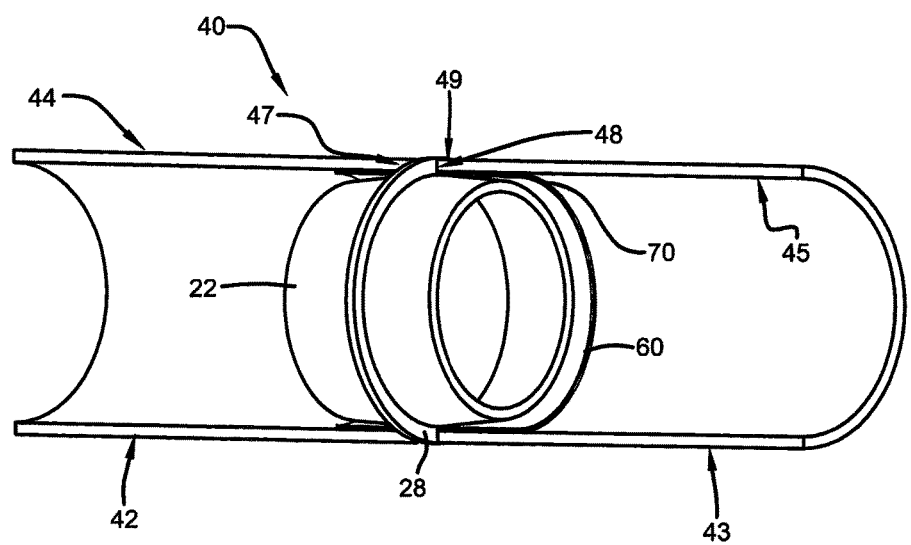

FIGS. 10A and 10B show a cross-section of a pipe 40 formed by joining together pipe sections 42, 43 with joining member 20. Pipe sections 42 and 43 have an inner wall 45 and outer wall 44. The thickness of pipe sections 42, 43 is substantially uniform along the length of the pipe. The pipe sections 42, 43 do not include integral bell-and-spigot connection means at their ends 47, 48. The ends of pipe sections 42, 43 are positioned in end-to-end abutting contact along their longitudinal axes. Joining member 20 in engaged with the inner surfaces of the pipe sections 42, 43. The flange member 28 of the ring 22 of the joining member 20 extends upwardly into the space between the end faces of the end 47 of pipe section 42 and end 48 of pipe section 43 to form a butt joint 49 joining together pipe sections 43, 44. Additional fiber reinforced polymer composite wrap 50 is applied around the outer wall 44 of pipe sections 42, 43 at the location of the butt joint 49 to further reinforce and strengthen the butt joint 49. A primer layer 60 is applied to the inner surfaces 45 of piper sections 42, 43 and an adhesive layer 70 is applied to the primer layer 60.

EXAMPLES

A joining member having a thickness of about 0.25 inch and a 36-inch inside diameter (ID) concrete pipe was prepared and shear tested in accordance with ASTM C497. The concrete pipe was prepared without bell and spigot end connections, and two sections of pipe were joined with a substantially cured fiber reinforced polymer composite joining member.

Figure 11:
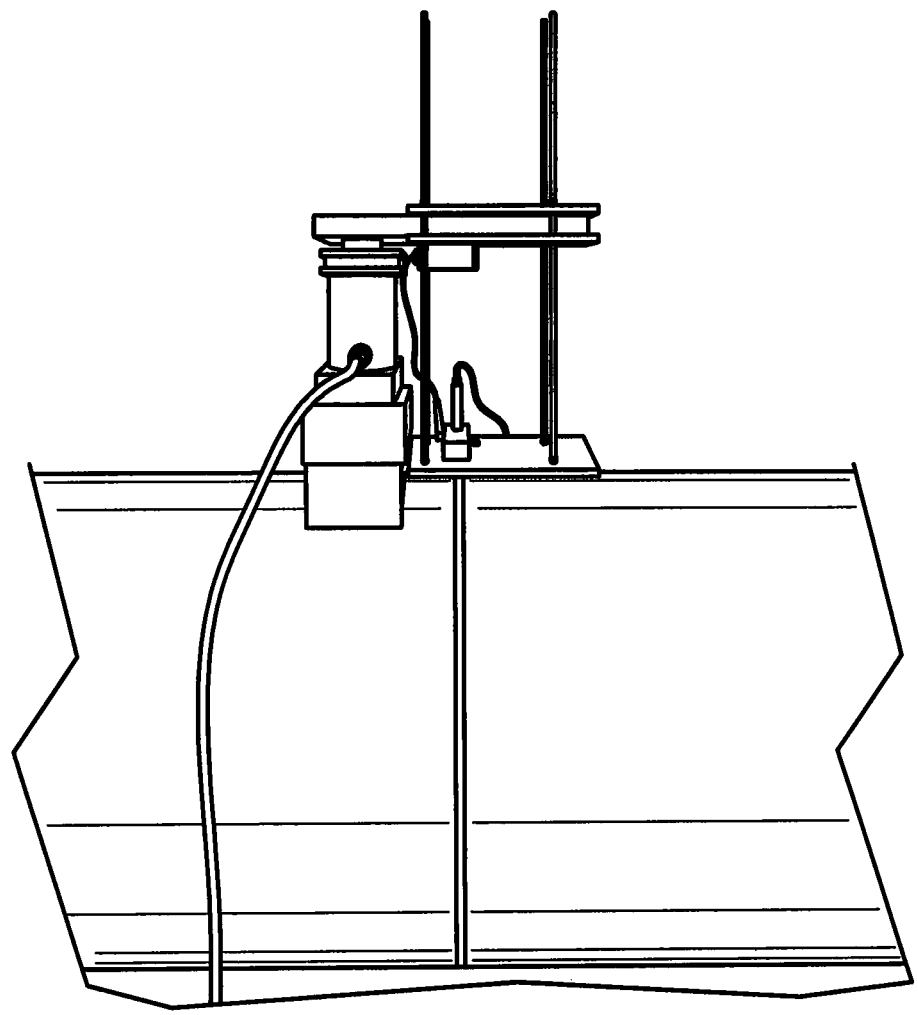
FIG. 11 is a photograph depicting the displacement and crack propagation of a concrete pipe subjected to shear testing in accordance with ASTM C497.

FIG. 11 is depicts the shear testing set up according to ASTM C497. Pipe sections 80, 82 each had outer walls 81, 83 and inner walls (not shown). The pipe sections 80, 82 were laid in an end-to-end arrangement. A joining member comprising a cured fiber reinforced polymer composite coupler comprising MASTERBRACE® carbon fiber fabric as the fiber reinforcement and MASTERBRACE® SAT 4500 as the polymer resin component of the composite was used to join the pipe sections together. The joining member was inserted into the pipe sections and the pipe sections moved into adjacent contact with pipe ends 84, 85 abutting one another to create butt joint 86. A loading location 87 was created with several wooden boards banded together. A loading force L was applied downward on the loading location 87, and subsequently transferred to pipe 80.

Figure 12:
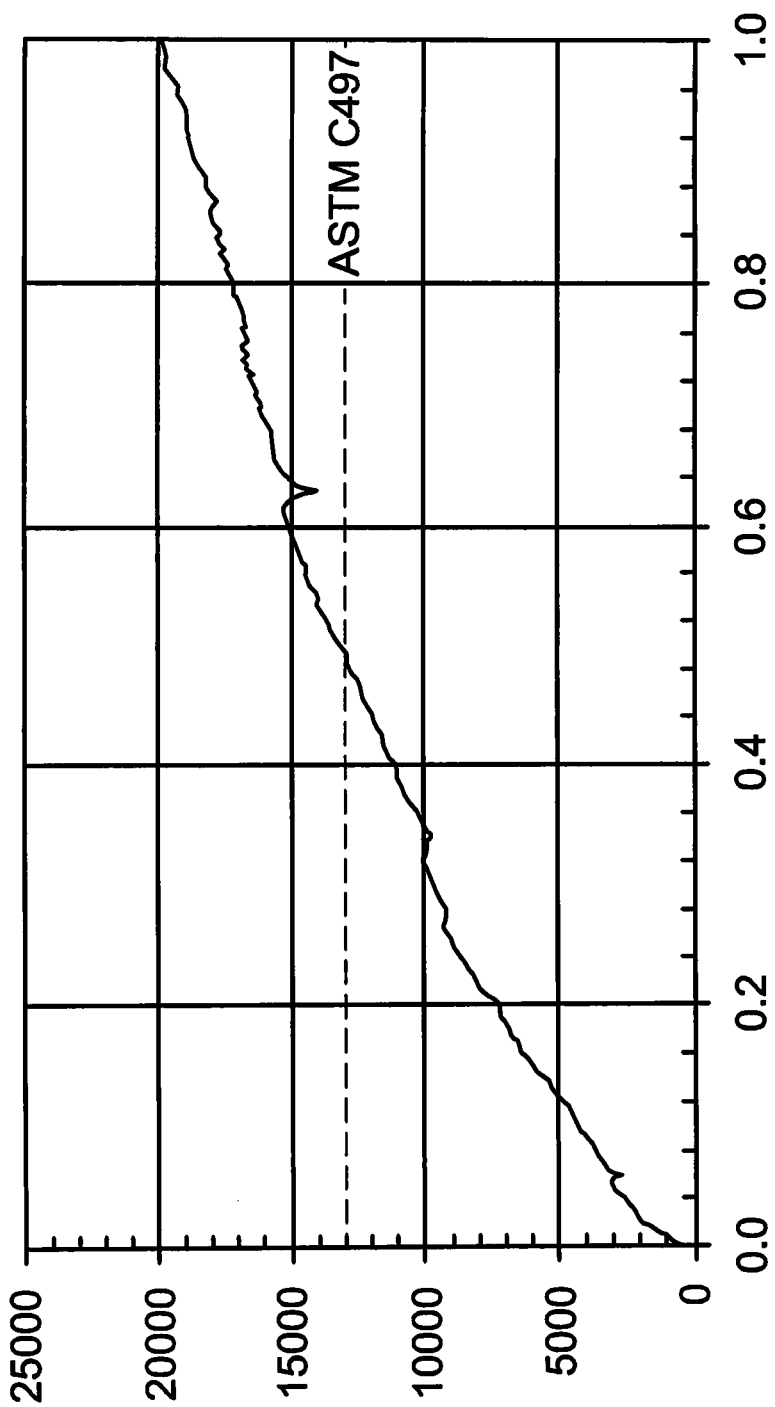
FIG. 12 is a graph depicting the load and deflection behavior of a concrete pipe with a fiber reinforced polymer joining member that has undergone shear testing in accordance with ASTM C497.

FIG. 12 is a graph showing the results of the ASTM shear testing of the pipe. According to the ASTM C497 standard, a concrete pipe section subjected to load L must achieve an ultimate load of at least 13,000 lbf. The joining member portion of the pipe tested in accordance with the ASTM standard passed the testing regimen as it reached an ultimate load of 20,000 lbf. The failure was in the concrete portion of the pipe in response to the 20,000 lbf.

Figure 13:
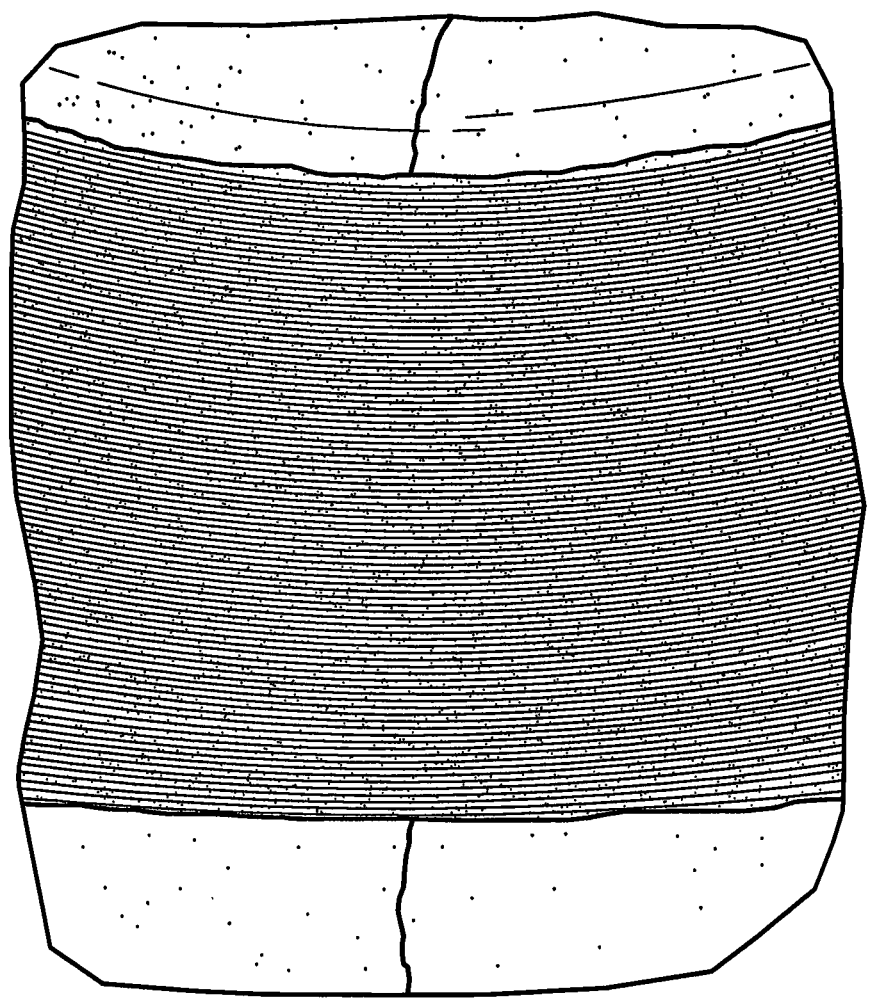
FIG. 13 shows crack development in the cementitious pipe. Cracks did not develop in the region of fiber reinforced polymer composite joining member.

FIG. 13 shows that cracks developed in the concrete pipe in areas away from the presently disclosed fiber reinforced polymer composite joining member. The cracks stopped as they reached the margin of the coupler in the regions of the pipe joint. Even as the concrete pipe failed at a load of 20,000 lbf, the region of the concrete pipe that was joined by the coupler was not damaged by the load or the shearing forces created along with the load.

While the pipe and fiber reinforced polymer have been described in connection with various illustrative embodiments, it is to be understood that other similar embodiments may be used or modifications and additions may be made to the described embodiments for performing the same function disclosed herein without deviating therefrom. The embodiments described above are not necessarily in the alternative, as various embodiments may be combined to provide the desired characteristics. Therefore, the pipe and fiber reinforced polymer should not be limited to any single embodiment, but rather construed in breadth and scope in accordance with the recitation of the appended claims.

We claim:

1. A joining member for pipe sections comprising:
a continuous band comprising a fiber reinforced polymer composite having a thickness defined between an inner surface and an outer surface and a width defined between opposite marginal sides, and a flange member extending radially outwardly from the outer surface of said continuous band, wherein said outer surface of said continuous band is tapered, and wherein said thickness of said continuous band decreases from said flange toward said opposite marginal sides of said continuous band, wherein said outer surface of said continuous band is sloped relative to said inner surface of said continuous band, wherein said inner surface of said continuous band is configured to be substantially parallel with said pipe section, wherein said fiber reinforced polymer composite comprises a polymer matrix reinforced with fiber reinforcement, and wherein said fiber reinforcement comprises a fiber fabric.

2. The joining member of claim 1, further comprising a sealing member engaged with said joining member.

3. The joining member of claim 2, wherein said sealing member comprises a rubber gasket sealing member.

4. The joining member of claim 1, wherein said polymer matrix comprises thermoplastic or thermosetting polymers selected from the group consisting of epoxy, polyester, vinyl ester, acrylic, modified acrylic, urethane, phenolic, polyamide, bismaleimide, polyurea, polyvinylidene fluoride, chlorinated polyvinyl chloride, polyvinyl chloride, polybutylene, cross-linked polyethylene, polyethylene, or combinations thereof.

5. The joining member of claim 4, wherein said polymer matrix comprises an epoxy.

6. The joining member of claim 1, wherein said fiber fabric comprises an inorganic fiber fabric or an organic fabric.

7. The joining member of claim 6, wherein said inorganic fiber fabric or organic fiber fabric comprises a uni-directional, or bi-directional fabric.

8. The joining member of claim 7, wherein said inorganic fiber fabric comprises a bi-directional fabric.

9. The joining member of claim 7, wherein said bi-directional inorganic fiber fabric comprises a basalt fiber fabric, carbon fiber fabric, metal fiber fabric, fiberglass fabric, or combinations thereof.

10. The joining member of claim 7, wherein said bi-directional organic fiber fabric comprises a aramid fabric, ultra-high molecular weight polyolefin fabric, or combinations thereof.

11. The joining member of claim 1, wherein said fiber reinforced polymer composite comprises an epoxy matrix reinforced with a fiberglass fabric reinforcement.

12. The joining member of claim 1, wherein said fiber reinforced polymer composite comprises an epoxy matrix reinforced with a carbon fiber fabric reinforcement.

13. A pipe comprising:
a plurality of pipe sections, each pipe section comprising a wall thickness defined between an inner surface and an outer surface and a length defined between opposite end faces, wherein said pipe sections do not have integral connection means at opposite longitudinal ends of the pipe sections for connecting one pipe section to another pipe section, wherein said pipe sections are coupled together in an end-to-end manner along their longitudinal axes with a joining member, said joining member comprising
a continuous band comprising a fiber reinforced polymer composite having a thickness defined between an inner surface and an outer surface and a width defined between opposite marginal sides and a flange member extending radially outwardly from the outer surface of said continuous band, wherein said outer surface of said continuous band is tapered, and wherein said thickness of said continuous band decreases from said flange toward said opposite marginal sides of said continuous band, wherein said pipe comprises a cementitious pipe, wherein cementitious pipe comprises a cementitious matrix and a reinforcement, wherein said reinforcement comprises a reinforcing fabric at least partially embedded in said cementitious matrix, wherein said reinforcing fabric is selected from an inorganic or organic fiber fabric.

14. The pipe of claim 13, wherein said cementitious matrix is selected from concrete, mortar, grout, or hydraulic paste.

15. The pipe of claim 14, wherein the cementitious matrix comprises concrete.

16. The pipe of claim 13, wherein said reinforcing fabric is an inorganic fiber fabric, wherein said inorganic fiber fabric is selected from basalt fiber fabrics, carbon fiber fabrics, fiberglass fiber fabrics, metal fiber fabrics and metal alloy fiber fabrics.

17. The pipe of claim 16, wherein said fabric comprises a bi-directional inorganic fiber fabric.

18. The pipe of claim 13, wherein said reinforcing fabric is an organic fiber fabric, wherein said organic fiber fabric is selected from aramid fabrics, ultra-high molecular weight polyolefin fabrics, or combinations thereof.

19. The pipe of claim 18, wherein said fabric comprises a uni-directional, or bi-directional fabric.

20. The pipe of claim 19, wherein said fibrous fabric comprises a bi-directional fabric.

21. The pipe of claim 19, wherein said fibers of said organic fiber fabric are polyolefin fibers.

22. The pipe of claim 21, wherein said polyolefin fibers are polypropylene fibers.

23. The pipe of claim 13, wherein said reinforcement comprises a reinforcing fabric at least partially embedded in said cementitious matrix and a plurality of discrete reinforcing fibers randomly dispersed within the cementitious matrix.

24. The pipe of claim 13, wherein at least two of said plurality of pipe sections does not have integral bell and spigot connections or integral tongue-and-groove connections at opposite longitudinal ends of said pipe sections.

25. The pipe of claim 13, wherein said continuous band comprises a continuous ring and said flange member extends radially outwardly from said outer surface of said continuous ring.

26. The pipe of claim 25, further comprising a sealing member engaged with said joining member.

27. The pipe of claim 26, wherein said sealing member comprises a rubber gasket sealing member.

28. The pipe of claim 13, wherein said fiber reinforced polymer composite comprising the joining member comprises a polymer matrix reinforced with fiber reinforcement.

29. The pipe of claim 28, wherein said polymer matrix of said fiber reinforced polymer composite comprising the joining member comprises thermoplastic or thermosetting polymers selected from the group consisting of epoxy, polyester, vinyl ester, acrylic, modified acrylic, urethane, phenolic, polyamide, bismaleimide, polyurea, polyvinylidene fluoride, chlorinated polyvinyl chloride, polyvinyl chloride, polybutylene, cross-linked polyethylene, polyethylene, or combinations thereof.

30. The pipe of claim 29, wherein said polymer matrix of said fiber reinforced polymer composite comprising the joining member comprises an epoxy.

31. The pipe of claim 28, wherein said fiber reinforcement of said fiber reinforced polymer composite comprising the joining member comprises an organic fiber reinforcement.

32. The pipe of claim 28, wherein said fiber reinforcement of said fiber reinforced polymer composite comprising the joining member comprises a fiber fabric.

33. The pipe of claim 32, wherein said fiber fabric fiber comprising the reinforcement of said fiber reinforced polymer composite comprising said joining member comprises an inorganic fiber fabric.

34. The pipe of claim 33, wherein said inorganic fiber fabric comprising the reinforcement of said fiber reinforced polymer composite comprising said joining member comprises a uni-directional, or bi-directional fabric.

35. The pipe of claim 34, wherein said inorganic fiber fabric comprising the reinforcement of said fiber reinforced polymer composite comprising said joining member comprises a bi-directional fabric.

36. The pipe of claim 35, wherein said bi-directional inorganic fiber fabric comprising the reinforcement of said fiber reinforced polymer composite comprising said joining member comprises a basalt fiber fabric, carbon fiber fabric, metal fiber fabric, or fiberglass fabric.

37. The pipe of claim 32, wherein said bi-directional organic fiber fabric comprising the reinforcement of said fiber reinforced polymer composite comprising said joining member comprises an aramid fabric, ultra-high molecular weight polyolefin fabric, or combinations thereof.

38. The pipe of claim 28, wherein said fiber reinforced polymer composite comprising said joining member comprises an epoxy matrix reinforced with a fiberglass fabric reinforcement.

39. The pipe of claim 28, wherein said fiber reinforced polymer composite comprising said joining member comprises an epoxy matrix reinforced with a carbon fiber fabric reinforcement.

40. The pipe of claim 13, wherein said ring of said joining member is attached to the inner surface of said adjacent pipe sections near the ends of said adjacent pipe sections with the flange member of said joining member extending between the end faces of said adjacent pipe sections.

41. The pipe of claim 40, further comprising a fiber reinforced polymer matrix wrapped around at least a portion of the outer surfaces of adjacent pipe sections near the ends of end-to-end pipe sections that are coupled by said joining member.

42. The pipe of claim 40, further comprising a primer layer between said inner surface of said pipe sections and said outer surface of said continuous band of said joining member.

43. The pipe of claim 40, further comprising an adhesive layer between said primer layer between said outer surface of said continuous band of said joining member.

44. A method of joining pipe sections to make an elongated pipe comprising:
 providing a plurality of pipe sections;
 positioning said pipe sections in an end-to-end manner along their longitudinal axes;
 attaching a joining member to the inner surfaces of said adjacent pipe sections near the ends of said adjacent pipe sections being joined with a flange member of said joining member extending between the end faces of said end-to-end pipe sections; attaching a fiber reinforced polymer composite around at least a portion of the outer surfaces near the ends of end-to-end pipe sections, wherein said joining member comprises a continuous band, wherein said continuous band comprises a band outer surface and a band inner surface, wherein said band outer surface is sloped relative to said band inner surface of said continuous band, wherein said band inner surface of said continuous band is substantially parallel with said pipe section, wherein said fiber reinforced polymer composite comprises a polymer matrix reinforced with fiber reinforcement, and wherein said fiber reinforcement comprises a fiber fabric; and
 permitting said fiber reinforced polymer composite to cure.

* * * * *